US007039877B2

(12) United States Patent
Harrison et al.

(10) Patent No.: US 7,039,877 B2
(45) Date of Patent: May 2, 2006

(54) CONSERVING SPACE ON BROWSER USER INTERFACES

(75) Inventors: Edward R. Harrison, Beaverton, OR (US); James W. Lundell, Portland, OR (US); Rochelle J. Keeler, Portland, OR (US); Alyson R. Miller, Portland, OR (US); Cindy L. Merrill, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 09/754,849

(22) Filed: Jan. 4, 2001

(65) Prior Publication Data

US 2002/0085044 A1 Jul. 4, 2002

(51) Int. Cl.
*G09G 5/00* (2006.01)

(52) U.S. Cl. ...................................................... 715/779

(58) Field of Classification Search ................ 345/772, 345/779, 780, 773; 715/764, 772, 779, 814, 715/825
See application file for complete search history.

(56) References Cited

U.S. PATENT DOCUMENTS 6,072,486 A * 6/2000 Sheldon et al. ............. 345/835
6,396,518 B1 * 5/2002 Dow et al. .................. 715/772
6,714,220 B1 * 3/2004 Sigl ........................... 345/780

OTHER PUBLICATIONS

Microsoft Internet Explorer (Copyright 1995-2001).*

* cited by examiner

*Primary Examiner*—Kristine Kincaid
*Assistant Examiner*—Thanh Vu
(74) *Attorney, Agent, or Firm*—Trop, Pruner & Hu, PC

(57) ABSTRACT

A user interface enables the display of browser information in a space conserving fashion. A plurality of icons may be displayed along a bar adjacent a browser display window. When an icon is selected, an appropriate panel may be displayed. A uniform resource locator text entry block may only be displayed when an appropriate icon is selected. Thus the extra space that is lost through the display of the text entry block is only encountered when the user actually needs to make a uniform resource locator text entry.

20 Claims, 5 Drawing Sheets

CONSERVING SPACE ON BROWSER USER INTERFACES

BACKGROUND

This relates generally to user interfaces for processor-based systems.

User interfaces for processor-based systems facilitate the entry of user selections for software resident on those processor-based systems. For example, a browser may include a user interface with a button bar and a uniform resource locator entry block. A web page may be displayed below the button bar and uniform resource locator entry block.

The need to conserve display space may be critical with devices that have relatively smaller displays. Such devices may include personal digital assistants, web tablets and other portable devices. In such cases, all the space on the display or user interface may be critical to efficient use of the device.

Generally, the larger the display, the more expensive is the display. This may be a particular issue with portable devices using liquid crystal displays. In addition, larger displays result in larger and heavier devices which may be a distinct disadvantage, particularly for portable devices.

Thus there is a need for better ways to conserve space on browser user interfaces.

BRIEF DESCRIPTION OF THE DRAWINGS

FIG. 2 is a depiction of a user interface of FIG. 1 after the web search button has been selected in accordance with one embodiment of the present invention;

FIG. 3 is a depiction of a user interface of FIG. 1 after a URL has been entered in accordance with an embodiment of the present invention;

FIG. 4 is a flow chart for software resident on a processor-based system in accordance with one embodiment of the present invention; and FIG. 5 is a block depiction of hardware in accordance with one embodiment of the present invention.

DETAILED DESCRIPTION

Figure 1:
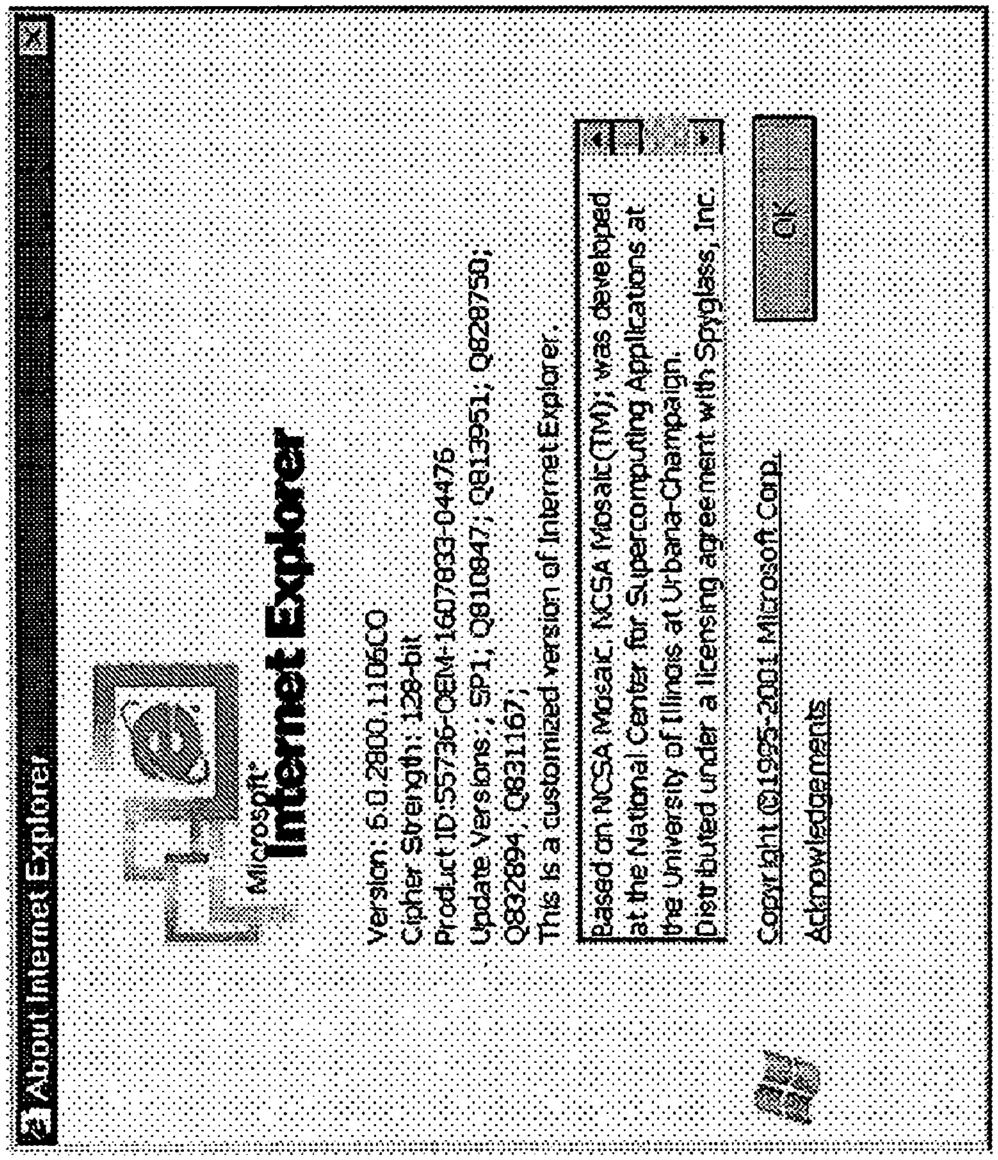
FIG. 1 is a depiction of a user interface in accordance with one embodiment of the present invention.

Referring to FIG. 1, a graphical user interface 10 may include a plurality of user selectable icons or images, called buttons herein, in a button bar 11. The user selectable buttons may include a web search button 16 and an audio button 17 in one embodiment. In this embodiment, there may be no persistently displayed uniform resource locator (URL) text entry block. A window 14 may display a selected web page or web search results as two examples.

Figure 2:
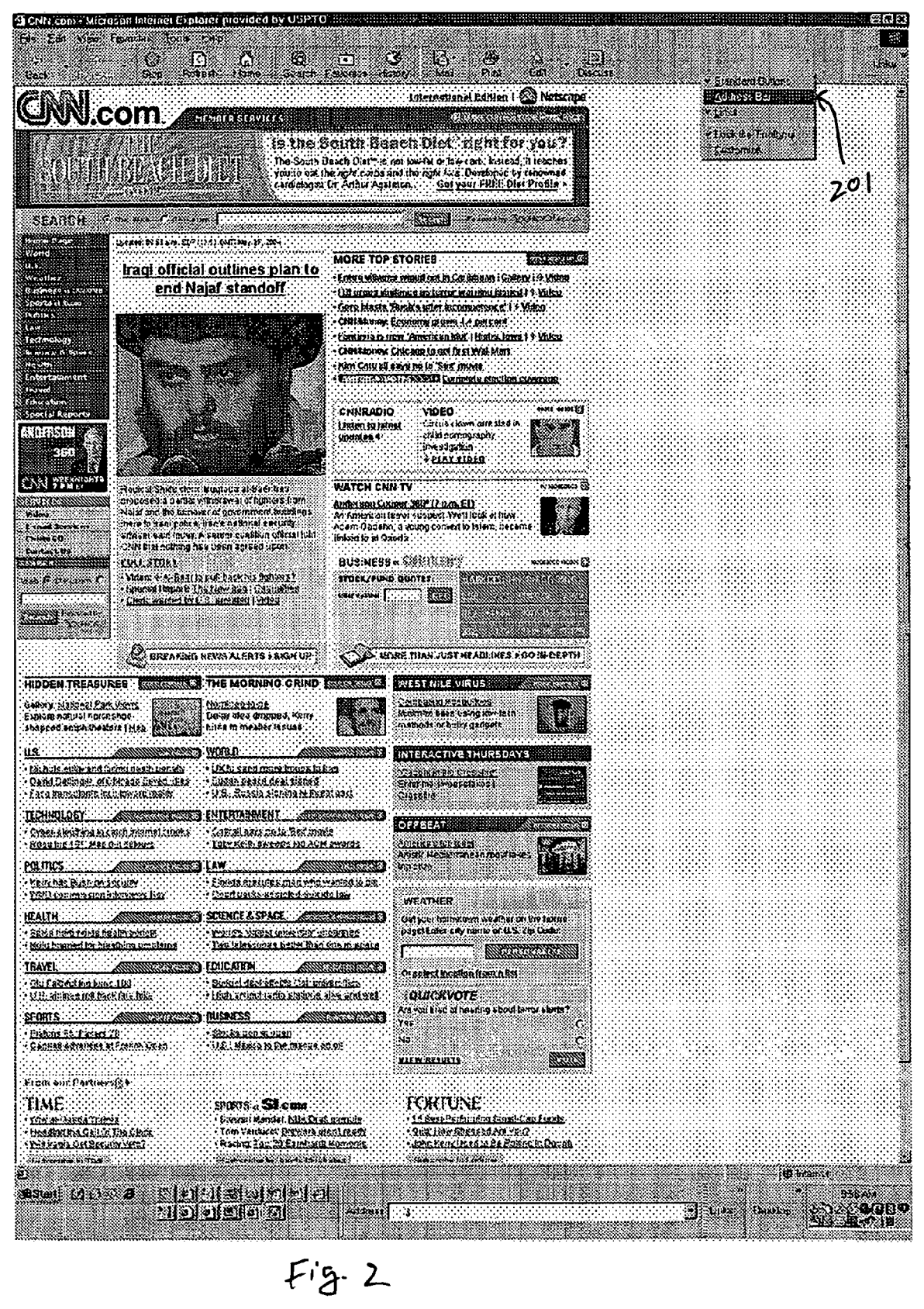

When a user selects the button 16, for example, using a mouse or touch screen system, a uniform resource locator text entry block or panel 12 appears at the bottom of the window 14 in place of the button bar 11, as shown in FIG. 2. The entry block 12 facilitates the entry of an appropriate URL to access a desired web page or the entry of text for web searching in one embodiment. By causing the block 12 to appear only on request, user interface 10 area is saved. Thus, space may be conserved by only presenting the text entry block 12 on user request.

Referring to FIG. 2, a keyboard image 64 and text entry block 12 are displayed in place of the button bar 11 upon selection of the web search button 16. In one embodiment, the keyboard image 64 includes a plurality of soft keys that may be selected using touch contact. The text entry block 12 allows the user to enter a uniform resource locator (URL) and then to select the go button 67 to access a selected web site.

When the user enters a URL in the block 12 and presses the go button 67, the interface 10*a* (FIG. 2) changes to the interface 10*b* shown in FIG. 3. A page loading bar 66 indicates that a selected web page, whose URL was entered in the block 68, is loading. The loading bar 66, over the button bar 11, replaces the keyboard image 64 and text entry block 12 user interface shown in FIG. 2, in one embodiment of the present invention. When the web page is finished loading, the web page may immediately appear in the window 14 and the loading bar 66 automatically disappears.

Similarly, when the controls button 17 is selected in the button bar 11 in FIG. 1, the audio controls bar 13 is automatically displayed, stacked on top of the button bar 11 as shown in FIG. 4. Moreover, whenever music is being played, the audio bar 13 may be displayed in one embodiment. Thus, in FIG. 2 for example, if audio were being played, the audio bar 13 would be stacked on top of the soft keyboard image 64.

In this way, space may be conserved by causing dynamic informational bars or panels to transiently appear on an interface 10. For example, the button bar 11 is only displayed when it is needed. Similarly, the keyboard image 64 is only displayed when needed. As soon as a web page, selected using the image 64, begins to load, the image 64 is automatically replaced by the loading bar 66. Similarly, the loading bar 66 is transient in that it is automatically replaced by still another bar after the page is finished loading. In this embodiment, informational interfaces are not maintained on the display screen substantially longer than they are useful, increasing the period of time when a greater amount of display screen area is available.

If a user selects still another selectable button in the bar 11, such as the button 17, still another panel 13 may be displayed, stacked on top of the panel 12. Each time another button in the bar 11 is selected, another panel may be displayed, stacked on top of the previously displayed panels in one embodiment of the present invention. The more panels that are selected, the more the panels take from the display area of the page in the window 14. However, only those panels that are actually needed end up being displayed in one embodiment.

Turning to FIG. 4, the software for controlling the display of panels or bars, such as the bars 12 and 13 begins by determining whether a button has been selected (diamond 22) on the button bar 11.

When a button in the bar 11 is selected, a check at diamond 23 determines whether to display the bar 12, in one embodiment. If the web search button 16 is selected, then the keyboard image 64 is displayed as indicated in block 24. In one embodiment, the keyboard image 64 is displayed below the window 14, replacing the button bar 11 to conserve window 14 display area. A loading bar 66 is displayed, as indicated in block 28, in place of the keyboard image 64 when text is entered.

A check at diamond 29 determines whether the desired page (web page or search results page) is ready. If so, that page is displayed in the window 14 over the button bar 11 (that replaces the loading bar 66).

Finally, referring to FIG. 5, one embodiment of a processor-based system 36 to implement the present invention is illustrated. Of course, the present invention is not in any way limited to any particular hardware architecture or arrangement. The embodiment shown in FIG. 6 is simply an illustration of a wireless mobile processor-based device.

In the system 36, a processor 38 is coupled to a touch screen display 40 and a power controller 42. The processor 38, in one embodiment, may be the StrongARM brand processor available from Intel Corporation. The processor 38 may also communicate with a host processor-based system using sync signals 58 and file transfer signals 60. Thus, the system 36 may be synchronized by transferring data from the system 36 to a host system (not shown) such as a desktop computer or other processor-based system.

The processor 38 is also coupled to a coder/decoder or codec 44. The codec 44 provides an analog output signal to headphones 46 or speakers 48.

A baseband section 50 is coupled to a radio frequency interface 52 in one embodiment. The interface 52 may facilitate communications with a base station using a wireless protocol. This may be the case in a variety of portable devices including web tablets and personal digital assistants, as two examples. In other embodiments, the system 36 may be a standalone system, may communicate over a tethered cable with a base station, or may use other wireless techniques such as infrared technology.

The processor of 38 is also coupled to a static random access memory (SRAM) 54 and a flash memory 56 in one embodiment. In that embodiment, the stack software 20 may be stored in the flash memory 56. Of course, other types of storage devices, such as hard disk drives, may also be used in other applications. The processor 38 is also coupled to one or more peripheral cards 62.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

generating a graphical user interface for the display of a processor-based system, said interface to include at least two bars;

displaying one of said bars in response to a user selection of the bar;

automatically, transiently displaying the other bar only for so long as information included on said other bar is valid; and replacing said other bar with a user selection bar after said information included on said other bar is no longer valid, said user selection bar to enable the selection of the one of said bars.

2. The method of claim 1 including, in response to the selection of a display feature that necessitates the entry of textual data, automatically displaying a text entry area and a keyboard image.

3. The method of claim 2, including removing said keyboard image and said text entry area in response to the user selection of a desired text entry.

4. The method of claim 3 including, when said text entry is a selection of a web page, automatically displaying the other bar indicating that the web page is being loaded, the other bar comprising a load status bar.

5. The method of claim 4 including automatically removing said load status bar when said web page has completed loading.

6. The method of claim 1, wherein displaying one of said bars comprises replacing said user selection bar with the one of said bars.

7. A system comprising:

a processor; and a storage coupled to the processor storing instructions that enable the processor to generate a graphical user interface including at least two information bars, temporarily display one of the bars in response to a user selection of an indicator on a user selection bar, automatically replace the display of said one of the bars to transiently display the other bar for so long as the information included on the bar is valid, and after said information is no longer valid, replace said other bar with said user selection bar.

8. The system of claim 7 wherein said system is a portable system.

9. The system of claim 7 wherein said storage stores instructions that automatically display a text entry area and a keyboard image in response to the selection of a display feature that necessitates the entry of textual data.

10. The system of claim 7, further storing instructions that enable the processor to replace the user selection bar with the one of said bars.

11. A method comprising:

generating a graphical user interface for the display of a processor based system, said interface to include a load status bar, a keyboard image, and a text entry area which enables a selection of a web site;

displaying said text entry area and said keyboard image in response to a selection of a display feature that necessitates the entry of textual data; and in response to a selection of a web page, automatically replacing the display of the text entry area with the display of the load status bar, the load status bar to be displayed only for so long as information included on said load status bar is valid.

12. The method of claim 11 including removing the display of the keyboard image in response to the selection of a web page.

13. The method of claim 11 including displaying a user selection bar together with said load status bar, said user selection bar to be displayed after said information is no longer valid.

14. The method of claim 11 wherein displaying said text entry area and said keyboard image includes displaying said text entry area and said keyboard image in response to a selection of a web search button on a user selection bar.

15. The method of claim 11 including replacing said load status bar with an information bar including said display feature.

16. An article storing instructions that enable a processor-based system to:

generate a graphical user interface for the display of a processor based system, said interface to include a load status bar, a text entry area, and a keyboard image;

display said text entry area and said keyboard image in response to the selection of a display feature that necessitates the entry of textual data; and in response to a selection of a desired text entry, automatically replace the display of the text entry area with the display of the load status bar, the load status bar to be displayed only for so long as information included on said load status bar is valid.

17. The article of claim 16 further storing instructions that enable the processor-based system to, when the text entry is a selection of a web page, automatically display the load status bar.

18. The article of claim 17 further storing instructions that enable the processor-based system to automatically remove the load status bar when the web page has completed loading.

19. The article of claim 16, further storing instructions that enable the processor-based system to replace a user selection bar with the text entry area and the keyboard image.

20. The article of claim 16 further storing instructions that enable the processor-based system to replace the display of said load status bar with an information bar that includes said display feature.

* * * * *